(12) United States Patent
Conrads et al.

(10) Patent No.: US 6,771,080 B2
(45) Date of Patent: Aug. 3, 2004

(54) MICROWAVE MEASURING DEVICE FOR DEFINING THE LOAD OF A TWO-PHASE FLOW

(75) Inventors: Hans Georg Conrads, Hanover (DE); Volkhard Klupsch, Barleben (DE); Alexander Halm, Magdeburg (DE)

(73) Assignee: Prozess - & Messtechnik Conrads GmbH., Barleben (DE)

( * ) Notice: Subject to any disclaimer, the term of this patent is extended or adjusted under 35 U.S.C. 154(b) by 13 days.

(21) Appl. No.: 10/328,515

(22) Filed: Dec. 23, 2002

(65) Prior Publication Data

US 2003/0117149 A1 Jun. 26, 2003

(30) Foreign Application Priority Data

Dec. 24, 2001 (DE) .......................................... 101 64 107

(51) Int. Cl.$^7$ .............................................. G01R 27/04
(52) U.S. Cl. ........................ 324/636; 324/637; 324/639
(58) Field of Search ................................ 324/633, 634, 324/636, 639, 640, 637

(56) References Cited

U.S. PATENT DOCUMENTS 5,351,521 A    10/1994    Cracknell .................... 73/19.1
5,485,743 A  *  1/1996    Taherian et al. ............ 73/61.44
6,659,026 B1 * 12/2003    Hendricks et al. ........... 110/347

FOREIGN PATENT DOCUMENTS

| DE | 33 17 215 A1 | 11/1983 | .......... G01N/22/00 |
| DE | 44 26 280 A1 | 2/1996 | .......... G01N/22/00 |
| DE | 196 50 112 C1 | 5/1998 | ............. G01F/1/74 |
| EP | 0669522 A2 | 8/1995 | ............. G01F/1/74 |
| WO | WO91/05243 | 4/1991 | .......... G01N/22/00 |
| WO | WO 03/056316 A2 * | 7/2003 | .......... G01N/22/00 |

* cited by examiner

Primary Examiner—N. Le
Assistant Examiner—Walter Benson
(74) Attorney, Agent, or Firm—Karl Hormann

(57) ABSTRACT

A microwave measuring device for defining the load of a two-phase flow consisting of solids or liquid particles suspended in a gaseous medium transported in a predetermined direction within a feed duct of electrically conductive materials. Antennae for transmitting and receiving microwaves are penetrating into the feed duct at a predetermined spacing from each other and first and second rods are penetrating into the feed duct ahead of and behind the transmitting and receiving antennae to define, with the feed duct section delimited by them, a resonator. Auxiliary field rods ahead of and behind the first and second field rods short circuit microwaves input into the feed duct section which in consequence of reflection, diffraction or heterodyning have become distorted.

18 Claims, 1 Drawing Sheet

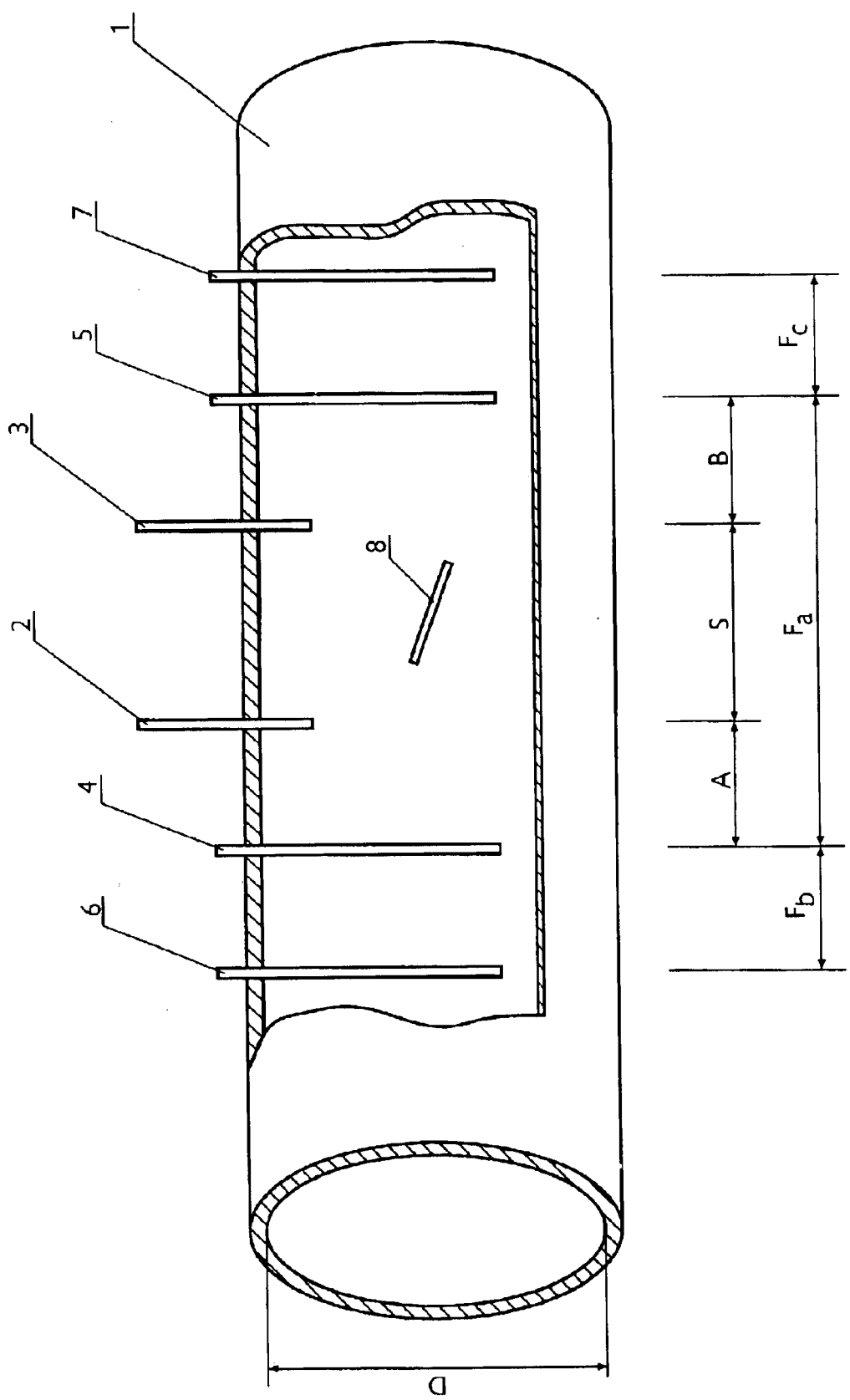

MICROWAVE MEASURING DEVICE FOR DEFINING THE LOAD OF A TWO-PHASE FLOW

BACKGROUND OF THE INVENTION

1. Field of the Invention

The invention, in general, relates to a microwave measuring device for defining the load of a two-phase flow comprising a gaseous carrier medium with small and minute solid particles and/or liquid particles as well as for defining the gas in a fluid flow. More particularly, the invention relates to defining the load of a gaseous flow of solids particles in a large-volume pneumatic solids transport system of the kind used, for instance, in pulverized coal furnaces of coal-fired power plants.

2. The State of the Art

It is known not only to define the particle load of two-phase flows comprising a gaseous carrier medium but also the proportion of gas contained in fluid flows, by means of microwaves. In a great many of the known systems of this kind, microwaves of a certain frequency are coupled into a portion of a feed duct prepared as a measuring conduit, and at the end of the conduit any changes in amplitude and phase of the microwave is registered. A preferred method of operation involves a waveguide fundamental wave to avoid undue complications and interferences. The physical background of the measuring principle resides in the fact that a change in the load of the carrier gas with solids and/or liquids or a change of the proportion of gas in a fluid flow leads to a change in the complex dielectric constant in the feed duct and that microwaves suffer an attenuation and phase shift as a function of this dielectric constant. German laid-open patent specification 44 26 280 A1 describes a method of determining the load of a gaseous flow with solids particles and, more particularly, for controlling the firing with pulverized coal of a boiler in a coal-fired power plant, by determining the solids content of the gaseous flow as a function of the attenuation of electromagnetic waves along a measuring conduit carrying the gaseous flow. As described in German patent 33 17 215 C1, the quantity of the particle load of exhaust gas is similarly derive from the attenuation of microwaves during their passage through the particle-bearing exhaust gas. A method is described in WO 91/05243 in which the content of oil or water in an oil-water mixture as well as the velocity thereof are determined by evaluating the attenuation and phase shift of microwaves along a measuring conduit. The methods described above are subject to significant problems because of the effect of interferences resulting from reflected microwaves or because of geometric changes in the feed duct system. With small loads in particular the microwave attenuation is so little that microwaves, like in a waveguide, are propagating over long distances and are reflected and/or diffracted at narrows, branches, curves or ends. The result is heterodyning of waves propagating to and fro and, hence, measuring results difficult to evaluate or significant distortions in the evaluation.

To avoid the effect of such disturbances, systems have been developed which utilize geometrically defined microwave resonators. A device of this kind has been described in European published patent specification 0,669,522 A2 in which a powder-mass flow in a powder-gas-mixture is measured while it is being fed through a feed duct. In this system, the microwave resonator is either mounted on the exterior of the feed duct or it circumscribes the feed duct in the manner of a cavity resonator. With the cavity resonator mounted exteriorly of the feed duct the measurement is taken of only a portion of the flow of the powder-gas-mixture. When, as is often the case in large volume feed ducts, different particle loads of the powder-gas-mixture occur over the cross-section of the feed duct, or when, sometimes, ropes of increased particle concentration have to be taken into consideration, the results of measurements derived from a cavity resonator mounted on the exterior of the feed duct may suffer from significant errors. Such errors do not occur with a cavity resonator circumscribing a feed duct. However, such resonators entail significant structural complexities and in large-volume feed ducts they cannot usually be realized for reasons of lacking space. Hence, such an arrangement is limited in its application to areas in which relatively small feed cross-sections occur such, as, for instance, in power coating apparatus.

As a further development of the system described in European published patent specification, German patent 196 50 112 C1 describes a microwave resonator which is characterized by relatively low structural complexity. In principle, the resonator consists of a cylindrical coil surrounding a non-conductive portion and shielded to the exterior by electrically conductive cylinder (helix resonator). The coil is caused to resonate by a high frequency alternating voltage (in the microwave range). By evaluating, as is well known, the shift in resonant frequency current, it is possible to define the powder mass flow. This arrangement, too, can either not be used in connection with large volume feed ducts which usually consist of an electrically conductive material (metal), or would entail significant structural complexity as a portion of the feed duct would have to be made of a non-conductive material. At the relevant structural sizes and resultant low resonant frequency the helix resonator consisting of the coil and the electrically conductive shield would be quite voluminous.

For defining the proportions of gas-oil-water-mixtures in transport pipe lines, U.S. Pat. No. 5,351,521 A describes a system for measuring large changes of the complex dielectric constant. This is accomplish by a consecutive arrangement, within the transport pipe line, of stepped continuous pipe sections of reducing diameter. Measuring electrodes are disposed within the pipe sections for measuring and evaluating, in accordance with the reducing diameter of the pipe sections, different threshold frequencies and, hence, different frequency ranges of the input microwave. The pipe sections are supported by electrically conductive rods which extend in radial patterns between the outer wall of each pipe section to the inner wall of the transport pipe line. The described arrangement of the electrically conductive rods prevent the input microwaves from passing through the space between the inner wall of the transport pipe line and the outer wall of the pipe sections. The arrangement is characterized by a relatively large measuring range. The attainable measuring accuracy is insufficient, however, for the preferred application of defining the load in gaseous flow of solids particles in large volume pneumatic solids transport systems of the kind used, for instance, in pulverized coal fired systems of coal fired power plants. Moreover, the necessary installations of the pipe sections into transport pipe lines are complex and have a significant effect upon the flow conditions within the transport pipe line.

OBJECTS OF THE INVENTION

It is an object of the invention to provide a microwave measuring device for defining the load of a two phase flow of a gaseous carrier medium and small and minute solids and/or liquid particles.

It is a further object to provide a microwave measuring device for defining the gas contained in a fluid flow.

Moreover, it is an object of the invention to provide a microwave measuring device of the kind referred to which its high measuring accuracy notwithstanding may be cost-efficiently fabricated and which may be utilized in a broad field of applications.

A further object of the invention resides in the provision of a microwave measuring system of the kind referred to which is particularly useful in large volume feed ducts, even at low loads or small load differences.

It is yet another object of the invention, the provide a microwave measuring system of relatively simple construction and which may easily be integrated into existing feed ducts of feed duct systems.

It is another object of the invention to provide a microwave measuring system which in performing measurements always includes the entire cross-section of the flow in the feed duct.

SUMMARY OF THE INVENTION

These and other objects are accomplished, in accordance with the invention, in a microwave measuring device for defining the load of a two phase flow with a gaseous carrier medium and small and minute solids particles and/or liquid particles as well as for defining the gas contained in a fluid flow, by the insertion into a feed duct section made of electrically conductive material in the longitudinal direction thereof ahead of and behind the measuring path defined by a transmission antenna for inputting microwaves into the feed duct and a receiving antenna for the reception of microwaves changed along the measuring path in frequency, amplitude and/or phase, of an electrically conductive rod (hereafter called "field rod") such the feed duct section limited by the field rods in connection with the field rods acts as a resonator for input microwaves. The spacing between the field rods and, hence, the feed duct section limited by the field rods determines the resonant frequency of the resonator.

The field rods are to be placed approximately in the polarization plane of the input microwaves and approximately within the cross-sectional plane of the electrically conductive feed duct section, directed either similarly or opposite. They should be arranged such that they point approximately radially toward or intersect the center of the cross-sectional plane. The length of the field rods is to be such that they extend at least to the center of the cross-sectional plane or, advantageously, extend $2/3$ through the cross-sectional plane.

For the function of the invention it is not necessary that the feed pipe section which in connection with the field rods acts as a microwave resonator be of circular cross-section. The cross-sectional surface may also be oval, square, rectangular ore polygonal. In the present context, the term "medium diameter" is to be understood as referring to the average distance between to opposite wall surface elements of the feed duct.

Advantageously, with respect to the unambiguity of the measuring results as well as the attainable measuring accuracy the frequency of input microwaves should correspond to the fundamental wave of the waveguide.

Proceeding from the preferred use of the waveguide fundamental wave for defining the changes of the dielectric constant and, thus, to determining the load, the length of the measuring path between the transmission and receiving antennae should be such that it corresponds to 0.8 to 3 times, preferably 1.5 times the average diameter of the feed duct section. The field rods are thus to be aligned in the longitudinal direction of the feed duct ahead of the transmission and behind the receiving antenna. The electric system composed of the field rods and electrically conductive feed duct section then will act as a resonator for the fundamental wave of the waveguide.

Microwaves which have been altered by reflection, diffraction and heterodyning outside of the measuring section or, within the feed duct, in their plane of polarization and/or phase position and which may cause distortions of the measurement results, will be substantially short circuited by the field rods.

Excepted from this effect of the field rods are microwaves the electrical field strength of which equals zero at the position of the field rods. In order to prevent penetration of these microwaves into the section of the feed duct containing the measuring path and serving as a resonator for the input microwaves and cause distortions in the measuring results, it is efficacious to provide auxiliary field rods ahead of and behind the feed duct sections delimited by the field rods. The auxiliary field rods are directed equal or opposite to the field rods, i.e. they are also disposed in the plane of polarization of the input microwaves. Their distance from the field rods and from the resonator for input microwaves formed by the field rods and feed duct section is to be dimensioned such that microwaves the electrical field strength of which equals zero at the field rods, are short circuited outside of the resonator. A distance corresponding to $1/8$ of the wave length of the resonant frequency of the resonator would be appropriate because microwaves of twice or tree times the frequency of the resonant frequency of the resonator are substantially short circuited. The length of the auxiliary field rods should correspond to the length of the field rods.

With the preferred use of the fundamental wave hollow wave guide for defining the load the auxiliary field rods should be arranged from the field rods at $7/8$ of the distance of the average diameter of the feed duct section.

Furthermore and particularly in connection with a feed duct of symmetrical cross-section (circle, square, hexagon) it is advantageous to place an auxiliary field rod in the center of the measuring path, rotated 90° in the cross-sectional surface relative to the field rods and the plane of polarization. In that manner, the waveguide characteristics of the measuring path are changed vertically of the plane of polarization of the input microwaves such that in the range of the resonant frequency of the resonator no resonance effects occur in consequence of microwaves rotated 90° in the polarization plane relative to the input microwaves.

In respect of the function of the invention it is not important that the feed duct section be straight relative to its longitudinal axis. The function of the microwave measuring device in accordance with the invention remains unchanged even with a feed duct section which is curved or bent relative to its longitudinal axis.

Conceivably, and this constitutes one aspect of the invention, a plurality of field rods may be arranged, for instance in a grid pattern, in the respective cross-sectional surfaces, particularly in the case of very large feed duct cross-sections. In an arrangement of a plurality of field rods within a cross-sectional they need not necessarily point to, or intersect, the center of the cross-sectional surface. In such a case, the field rods should, however, be positioned in the polarization plane of the input microwaves.

A special advantage of the measuring device in accordance with the invention resides in its relatively simple and, therefore, cost-efficient construction. The construction is such that it may be adjusted to almost every size of fee duct. The measuring device in accordance with the invention may also be integrated without any difficulties into feed duct under spatially difficult conditions. The inventors found the measurement results obtained with the measuring device in accordance with the invention and using a conventional method of microwave measuring to be surprisingly accurate.

DESCRIPTION OF THE DRAWING

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended sole drawing, which:

schematically depicts a section of a feed duct with a microwave measuring device according to the invention.

DETAILED DESCRIPTION OF THE PREFERRED EMBODIMENT

The drawing depicts, in partial section, a section of a feed duct 1 for pneumatically transporting pulverized coal. The Feed duct 1 is of the kind typically used in pulverized coal-fired furnaces of coal-fired power plants. The feed duct 1 consists of corrosion-resistant steel. It is of approximate circular cross-section with a diameter D=200 mm. From the exterior, and extending into the interior of the feed duct 1, there consecutively mounted, in the longitudinal direction of the feed duct 1, at a spacing of 300 mm and forming a measuring path S, a transmission antenna 2 and a receiving antenna 3. Microwaves at frequencies between 840 and 860 MHZ are coupled in by the transmission antenna 2. These microwaves correspond to the waveguide fundamental wave of the feed duct 1. In the longitudinal direction of the feed duct 1, ahead of the transmission antenna 2 and behind the receiving antenna 3, there are provided field rods 4 and 5 extending radially into the interior of the feed duct 1, in the polarization plane of the input microwaves. The field rods 4 and 5 are separated from each other by a distance Fa of 700 mm, and from the transmission antenna 2 and receiving antenna 3 they are each separated by a distance of 200 mm. In the longitudinal direction of the feed duct 1 they are aligned with the transmission and receiving antennae 2, 3. Their length is 140 mm. The field rods 4, 5 consist of abrasion-resistant round steel of a diameter of 4 mm. The above-described system made up by the arrangement of field rods 4, 5 in the section of the feed duct 1 functions as a resonator for microwaves of the waveguide fundamental wave. In this manner, those microwaves which were coupled into the feed duct 1 by the transmission antenna 2 and which outside of the measuring path S have suffered alterations in consequence of diffraction, reflection and/or heterodyning in their polarization plane and/or phase position will be short circuited, i.e. they are not transmitted to the receiving antenna 3 and cannot, therefore, affect the result of any measurement. However, reflected or heterodyned microwaves the electrical field strength of which at the position of the field rods equals zero, are not short circuited by the described measuring arrangement and can, therefore, distort the result of the measurement. In order to prevent this, auxiliary field rods 6, 7 radially extending into the interior of the feed duct section 1 are mounted ahead of and behind the feed duct section 1 delimited by the field rods 4, 5. The auxiliary field rods 6, 7 are also disposed in the polarization plane of the input microwaves. In the longitudinal direction of the feed duct 1, the auxiliary field rods 6, 7 are respectively separated from the field rods 4, 5 by spacings Fb, Fc of 175 mm. Their length, like that of the field rods 4, 5, is 140 mm. Moreover, in the longitudinal direction, approximately in the center of the measuring path S, there is provided an auxiliary field rod 8 within the cross-sectional plane and rotated 90° relative to the field rods and, hence, to the polarization plane of the input microwaves. The purpose of the auxiliary field rod 8 is to prevent resonant effects of reflected microwaves rotated in the polarization plane by 90° relative to the field rods 4, 5, within the resonator formed by the field rods 4, 5 and the feed duct section 1.

What is claimed is:

1. A microwave measuring device for defining the load of a two-phase flow of a gaseous carrier medium and at least one of small and minute solids and liquid particles and for defining the gas contained in a fluid flow, comprising:
   a feed duct section made of electrically conductive material for accommodating the two-phase flow;
   a transmission antenna and a receiving antenna mounted in the feed duct section at a predetermined space from each other for forming a measuring path therein;
   first and second electrically conductive field rods respectively mounted in the feed duct to extend into the interior thereof of ahead of and behind the measuring path and aligned with the transmission and receiving antennae for forming a resonator in the section of the feed duct between the first and second field rods.

2. The microwave measuring device of claim 1, wherein the field rods are respectively aligned with the transmission and receiving antennae.

3. The microwave measuring device of claim 1, wherein the field rods are disposed substantially in the cross-sectional plane of the feed duct section and are pointing in the same direction.

4. The microwave measuring device of claim 1, wherein the field rods are disposed substantially in the cross-sectional plane of the feed duct section and are pointing in opposite directions.

5. The microwave measuring device of claim 1, wherein the field rods are disposed to point to the center of the cross-sectional plane of the feed duct section.

6. The microwave measuring device of claim 1, wherein the field rods are disposed to intersect the center of the cross-sectional plane of the feed duct section.

7. The microwave measuring device of claim 6, wherein the field rods cross the interior of the feed duct section by more than two thirds of the diameter thereof.

8. The microwave measuring device of claim 1, wherein auxiliary field rods are mounted ahead of and behind the feed duct section delimited by the first and second field rods.

9. The microwave measuring device of claim 8, wherein the auxiliary field rods extend in parallel to and in the same direction as the first and second field rods.

10. The microwave measuring device of claim 8, wherein the auxiliary field rod extend in parallel to and in direction opposite the direction of the first and second field rods.

11. The microwave measuring device of claim 8, wherein the auxiliary field rods are spaced from the first and second field rod by a distance corresponding to one eighth of the wavelength of the resonant frequency of the resonator.

12. The microwave measuring device of claim 8, wherein the lengths of the first and second field rods and of the auxiliary field rods are substantially identical.

13. The microwave measuring device of claim 8, wherein the distance between the auxiliary field rods and the first and second field rods, respectively, corresponds to substantially ⅞ of the average diameter of the feed duct section.

14. The microwave measuring device of claim 1, wherein substantially in the middle between the transmission antenna and the receiving antenna there is provided in the cross-sectional plane of the feed duct section and rotated 90° relative to the field rods a third auxiliary field rod.

15. The microwave measuring device of claim 1, wherein at least two field rods are disposed parallel to each other in a cross sectional plane of the feed duct section.

16. The microwave measuring device of claim 1, wherein the measuring path between the transmission antenna and the receiving antenna corresponds to from about 0.8 to about 3 time the average diameter of the feed duct section.

17. The microwave measuring device of claim 16, wherein the measuring path corresponds to about 1.5 times the average diameter of the feed duct section.

18. The microwave measuring device of claim 1, wherein the distances between the receiving antenna and one of the first and second field rods and between the receiving antenna and the other of the first and second field rods corresponds to substantially the average diameter of the feed duct section.

* * * * *

UNITED STATES PATENT AND TRADEMARK OFFICE
CERTIFICATE OF CORRECTION

PATENT NO. : 6,771,080 B2
DATED : August 3, 2004
INVENTOR(S) : Hans Georg Conrads, Volkhard Klupsch and Alexander Halm It is certified that error appears in the above-identified patent and that said Letters Patent is hereby corrected as shown below:

Title page,
Item [73], Assignee, should read -- PROMECON Prozess- & Messtechnik GmbH., Barleben, Germany --

Signed and Sealed this

Thirtieth Day of November, 2004

JON W. DUDAS
*Director of the United States Patent and Trademark Office*